June 9, 1936.  A. FINE  2,043,478
LIQUID DISPENSER
Filed March 16, 1935   2 Sheets-Sheet 1

Abraham Fine,
INVENTOR.
BY Paul Purchard
ATTORNEY.

June 9, 1936.  A. FINE  2,043,478
LIQUID DISPENSER
Filed March 16, 1935  2 Sheets-Sheet 2

Abraham Fine,
INVENTOR.
BY Paul Purchard
ATTORNEY

Patented June 9, 1936

2,043,478

UNITED STATES PATENT OFFICE 2,043,478

LIQUID DISPENSER

Abraham Fine, Pittsburgh, Pa.

Application March 16, 1935, Serial No. 11,475

10 Claims. (Cl. 221—98)

This invention relates to fluid dispensing and measuring devices, and more in particular to small, portable devices, such as coffee-pots, drink-dispensers, oil cans, and the like.

One of the primary objects of this invention is to provide a fluid dispensing device whereby the fluid contained therein may be dispensed repeatedly in automatically measured amounts. Another object of this invention is to provide such a dispensing device wherein the fluid contained in the storage compartment of said device is automatically prevented from entering the measuring compartment while the fluid is being dispensed. Yet another object relates to means incorporated in the device which automatically seal the dispensing outlet while the so-called measuring compartment is being supplied with fluid from the storage compartment. Still another object of this invention is to provide a dispensing device whereby the amount of fluid dispensed at each pouring may be regulated to suit circumstances or the kind of fluid dispensed. Still a further object of this invention is the provision of a dispensing device of this character which is simple in construction and operation, which is accurate enough to satisfy most domestic requirements and which may be manufactured at relatively low cost.

Additional features and advantages of this invention will appear in the course of the following description considered in connection with the accompanying drawings forming a part of this application.

Figures 1, 3:
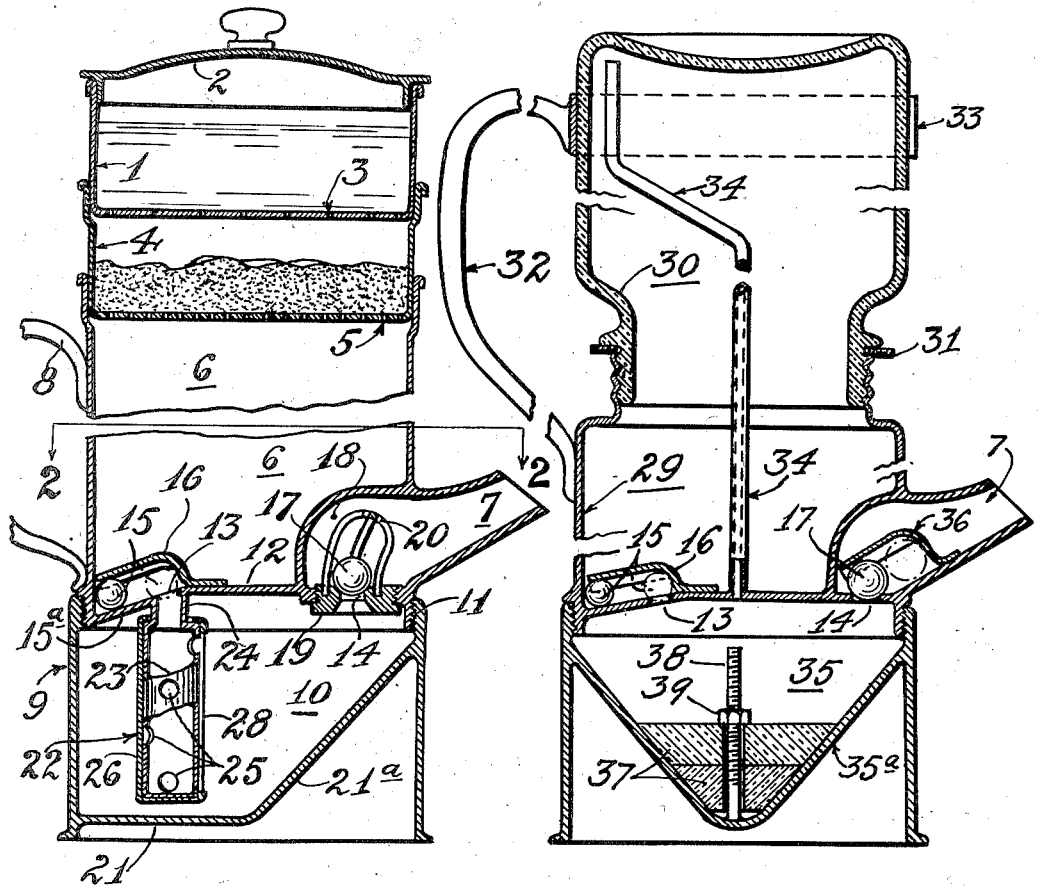
Fig. 1 is a longitudinal sectional view through a coffee pot in which my invention has been incorporated.
Fig. 3 is a longitudinal section through a modified dispensing device provided with a removable jar of the type known generally in the trade as Mason-jar.
Figure 2:
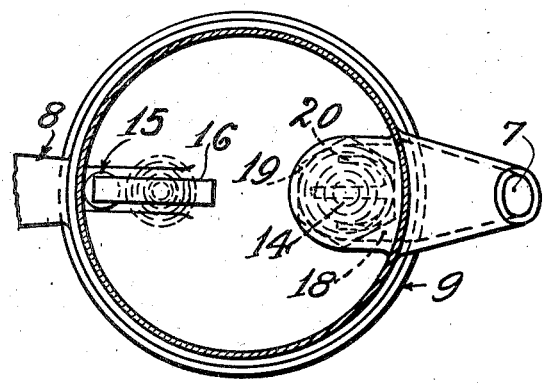
Fig. 2 is a cross-sectional view taken substantially on line 2—2 in Fig. 1.

Reference being had in particular to Figs. 1 and 2, the coffee-pot shown therein comprises a water compartment 1 provided with a cover 2 and a perforated bottom 3. This compartment telescopically engages a compartment 4, having also a perforated bottom 5 on which the ground coffee required to make the coffee beverage is placed. The resulting liquid coffee collects in the storage compartment 6 provided with a spout 7 and a handle or grip 8, of any suitable and desired type, whereby the container is manipulated.

The storage compartment is mounted either permanently or removably upon a base 9 in which the measuring-chamber 10 is located. In the present embodiment it has been assumed that the storage compartment and the base are removably connected by means of a screw-threaded connection 11, in order to facilitate the cleaning of the measuring chamber and the underside of the bottom 12 of the storage compartment.

The admission of liquid into the measuring chamber occurs through the inlet port 13, whereas the measured amount of coffee is dispensed from said chamber through the outlet port 14 and the spout 7 connected therewith.

The inlet port 13 is controlled by a ball valve 15 of suitable size arranged to slide or run on an inclined race 15ª formed in the bottom 12, and a guard 16, of any desired and suitable design is used to properly guide said ball and limit the forward movement thereof.

The outlet port 14 is controlled by a ball valve 17 of ample weight to overcome the hydrostatic pressure of the liquid within the storage compartment; this ball being located within the enclosure 18 formed by hermetically soldering or welding the inner end of the spout to the bottom 12 so as to completely separate the spout from the storage compartment. In the present embodiment the outlet port is drilled in a plug 19 screwed into the bottom 12 and having on its upper side a suitably shaped cage or guard 20 within which the ball 17 may freely move.

When the coffee pot is standing upright on its base, the inlet ball valve 15 runs down its inclined race 15ª into the position shown in solid lines, thus opening the inlet port 13. At the same time the ball valve 17 seats itself closely on the outlet port 14 and owing to its weight and accurate fit on the seat prevents any liquid or compressed air from passing through said port.

As the liquid coffee flows down from the storage compartment 6 into the measuring chamber 10, the rising liquid gradually compresses the air in the latter until the compression equals the hydrostatic pressure of the liquid coffee in the storage compartment, at which moment the flow of liquid will cease.

When tilting the coffee pot forwardly to serve coffee, the inlet ball valve 15 rolls forwardly as far as the guide 16 will permit and seats itself on the inlet port 13, thus preventing any transfer of liquid from the storage compartment into the measuring chamber. Simultaneously, the outlet ball valve 17 leaves its seat and allows the amount of liquid coffee in the measuring chamber to pour out through the spout 7.

Upon setting the coffee pot back into its normal upright position, the ball valves 15 and 17 will again revert to their original positions and the measuring chamber will again be filled and made ready for another serving.

To facilitate the emptying of the measuring chamber without unduly tilting the coffee pot, the bottom 21 of said chamber is, preferably, inclined upwardly towards the front, as indicated at 21$^a$.

Figures 5, 6, 7, 8:
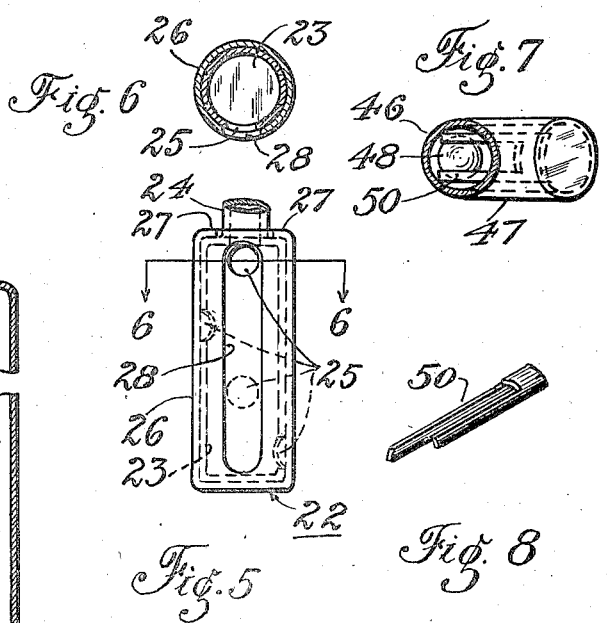
Fig. 5 is a front elevation of the so-called "regulator" incorporated in Fig. 1, whereby the amount of fluid dispensed at each serving may be regulated.
Fig. 6 is a cross-section taken on line 6—6, Fig. 5.
Fig. 7 represents a cross-section taken substantially on line 7—7 in Fig. 4.
Fig. 8 is a perspective view of a guide for the ball-valve controlling the outlet port of the dispensing device shown in Fig. 4.

If desired, the amount of liquid discharged into and from the measuring chamber may be regulated to suit especially the nature of the liquid dispensed. This regulation may be achieved by means of the regulator 22, used in Fig. 1 and further illustrated in Figs. 5 and 6.

The regulator comprises a vertical cylindrical shell 23 closed at the bottom and having a neck 24 in direct communication with the inlet port 13. In the cylindrical wall of this shell are provided apertures 25 of suitable size and shape and arranged in spirally spaced relation. A closely fitting cap 26 is rotatably mounted on the shell 23 and held thereon by folding the upper edge of the cap over the top of the shell, as at 27, or in any other desired and suitable manner. On the side of the cap there is cut a vertical slot 28, slightly wider than the apertures 25 and long enough to register successively with all of them. It will be noted that if the cap 26 is rotated so that the slot 28 registers with the lowermost aperture 25, liquid will flow freely into the measuring chamber 10, and shortly after the rising liquid has sealed this aperture, the compression of the air in said chamber will equalize the hydrostatic pressure of the liquid in the storage compartment and stop any further flow. By bringing the slot 28 in registry with any other of the higher situated apertures 25, the amount of liquid automatically dispensed at each serving may be increased and regulated.

The modified construction shown in Fig. 3 has a storage compartment comprising the lower part 29 on top of which is screwed a glass Mason-jar 30; a suitable gasket 31 being used to seal the connection. A grip 32, having its lower end secured to the wall of the lower part 29 of the storage compartment, is provided at its upper end with a split, resilient, ring 33 which snugly embraces the Mason-jar.

This modification further differs from the construction above described in that a vent-tube 34 is used to connect the measuring chamber 35 with the storage compartment to eliminate the gurgling sound caused by the air escaping through the inlet port at the same time as the liquid flows into the measuring chamber and to increase the flow of liquid into said chamber. As shown, this vent-tube reaches close up to the bottom of the inverted Mason-jar and is of relatively small size so as to store but a negligible amount of liquid.

Moreover, the bottom 35$^a$ of the measuring chamber is made substantially conical, and a slightly modified guide or guard 36 for the outlet ball valve is shown. All other parts being substantially similar to those already described, are identified by the same reference numerals.

It is evident that the addition of the vent-tube renders a regulator of the type above described inoperative since the latter's operation predicates the compression of the air within the measuring chamber.

One method of regulating the amount of liquid dispensed at each serving is to reduce, step-wise, the volumetric capacity of the measuring chamber by inserting therein suitable bodies, such as the substantially frusto-conical discs 37, each of which will reduce the capacity of this chamber according to its volume or displacement. To this end, a stationary threaded post 38 with a suitable clamping nut 39 may be provided in said chamber to hold the discs removably in place, as will be readily understood.

Figure 4:
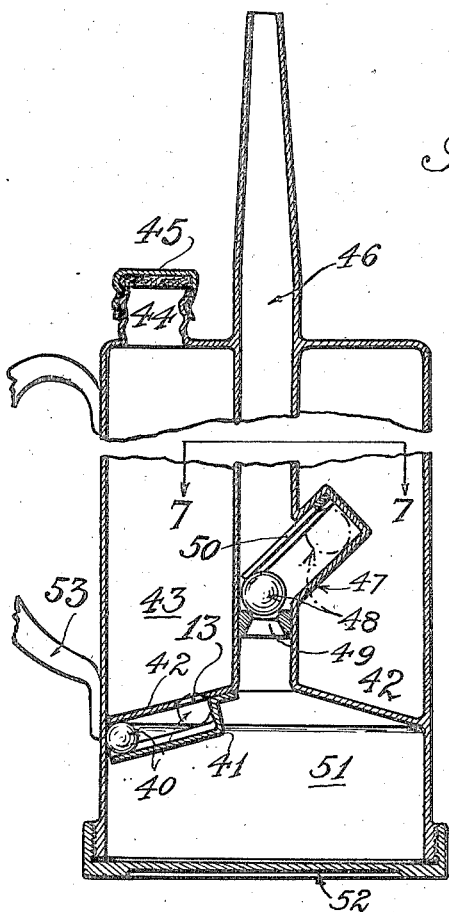
Fig. 4 is another longitudinal section showing the invention as applied to an oil-can, for instance.

The oil can shown in Fig. 4 is designed especially for full upside-down pouring, and for this reason the inlet ball valve 40 and its guide 41 are placed on the underside of the sloping bottom 42 of the storage compartment 43 which may be filled through the aperture 44 closed by the screwcap 45.

The spout 46 is preferably located centrally of the container and has an upwardly inclined lateral branch 47 closed at its upper end which serves as a cage for the ball-valve 48 of the outlet port 49. A bifurcated guide 50 secured in the branch 47 serves to properly guide said ball valve. The measuring chamber 51 is closed by a threaded cover 52 which forms the base of the dispensing device.

If desired, means of the types above described might also be incorporated in this oil can, in a manner readily apparent to persons versed in the art, to vary the amount of liquid dispensed at each pouring.

For large oil cans it may be found desirable to provide a suitable handle 53 to facilitate handling; but for small oil cans such a handle may be dispensed with and the can held directly in hand around its body, as will be readily understood.

It will be understood, of course, that the arrangements I have herein shown and described are merely suggestive of many that might be adopted in carrying out my invention, and I intend to include in this application all such variations as fall within the scope of the appended claims.

I claim:

1. In a liquid dispensing device, a container for storing the fluid having an integral bottom; a base for said container; means to removably secure the base to the container; a fluid measuring chamber positioned in said base; a spout positioned on the container; an inlet port positioned in said bottom to establish communication between the container and the measuring chamber; an outlet port also positioned in the bottom and connecting the measuring chamber with said spout, and valves for said inlet and outlet ports arranged in reverse operative relation.

2. In a liquid dispensing device, a container for storing the fluid having an integral bottom; a base for said container; a fluid measuring chamber positioned in said base; a spout positioned on the container; an inlet port positioned in said bottom to establish communication between the container and the measuring chamber; an outlet port also positioned in the bottom and connecting the measuring chamber with said spout, and ball-valves for said inlet and outlet ports arranged in reverse operative relation.

3. In a liquid dispensing device, a container for storing the fluid having an integral bottom; a base for said container; means to removably secure the base to the container; a fluid measuring chamber positioned in said base; a spout positioned on the container; an inlet port positioned in said bottom to establish communication between the container and the measuring chamber; an outlet port also positioned in the bottom and connecting the measuring chamber with said spout; ball-valves for said inlet and outlet ports arranged in reverse operative relation, and means to guide the movements of said ball-valves.

4. In a liquid dispensing device, a container for storing the fluid having an integral bottom; a base for said container; means to removably secure the base to the container; a fluid measuring chamber positioned in said base; a spout positioned on the container; an inlet port positioned in said bottom to establish communication between the container and the measuring chamber; an outlet port also positioned in the bottom and connecting the measuring chamber with said spout; ball-valves for said inlet and outlet ports arranged in reverse operative relation, and unitary means to limit and guide the movements of said ball-valves.

5. In a liquid dispensing device, a container for storing the fluid having an integral bottom; a base for said container; means to removably secure the base to the container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; unitary means to guide and limit the movements of said ball-valves, and means to vary the volumetric capacity of said measuring chamber.

6. In a liquid dispensing device, a container for storing the fluid having an integral bottom; a base for said container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; unitary means to guide and limit the movements of said ball-valves, and means to automatically limit the amount of liquid entering the measuring chamber.

7. In a liquid dispensing device, a container for storing the fluid having an integral bottom; a base for said container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; unitary means to guide and limit the movements of said ball-valves, and adjustable means to automatically limit the amount of liquid entering the measuring chamber.

8. In a liquid dispensing device, a container for storing the fluid having an integral bottom; a base for said container; means to removably secure the base to the container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; unitary means to guide and limit the movements of said ball-valves, and a regulator directly connected to the inlet port and positioned within the measuring chamber to regulate the amount of liquid entering same.

9. In a liquid dispensing device, a container for storing the fluid having an integral bottom; a base for said container; means to removably secure the base to the container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; separate unitary means to guide and limit the movements of said ball-valves, and a regulator arranged to regulate the amount of liquid supplied successively to the measuring chamber, said regulator comprising a closed cylindrical shell in direct communication with the inlet port and having a plurality of lateral apertures disposed in spaced relation; a cap revoluble about said shell, and means positioned on the cap to selectively establish communication between said shell and the measuring chamber through the apertures in the shell.

10. In a liquid dispensing device, a container for storing the fluid having an integral bottom; a base for said container; means to removably secure the base to the container; a fluid measuring chamber positioned below said bottom; a spout secured to the container; an inlet port positioned in said bottom to establish communication between the container and the measuring chamber; an outlet port also positioned in the bottom and connecting the measuring chamber with the spout; ball-valves for said inlet and outlet ports arranged in reverse operative relation; separate unitary means to guide and limit the movements of said ball-valves, and a regulator arranged to regulate the amount of liquid supplied successively to the measuring chamber; said regulator comprising a closed cylindrical shell in direct communication with the inlet port and having a plurality of lateral apertures disposed in spiral spaced relation, and a cap revoluble about said shell and having a longitudinal aperture arranged to selectively register with the apertures in said shell.

ABRAHAM FINE.